United States Patent [19]
Ito et al.

[11] Patent Number: 5,599,867
[45] Date of Patent: Feb. 4, 1997

[54] COMPOSITION FOR USE IN MANUFACTURING MOLDED CERAMIC BODY, METHOD OF MANUFACTURING MOLDED CERAMIC BODY FROM SUCH COMPOSITION, AND METHOD OF PRODUCING CERAMIC BODY

[75] Inventors: Naoki Ito; Yuji Miki; Atsushi Koizumi; Hiroshi Ichikawa, all of Saitama-ken, Japan

[73] Assignee: Honda Giken Kogyo Kabushiki Kaisha, Tokyo, Japan

[21] Appl. No.: 411,872

[22] Filed: Mar. 28, 1995

[30] Foreign Application Priority Data

Mar. 28, 1994 [JP] Japan ................................. 6-080943
Jun. 8, 1994 [JP] Japan ................................. 6-126107

[51] Int. Cl.$^6$ ..................... C08J 3/00; C08K 3/34; C08L 75/00; C03C 3/04
[52] U.S. Cl. ..................... 524/443; 501/53; 501/97; 501/127; 501/128; 524/56
[58] Field of Search .................. 524/443, 56; 501/53, 501/97, 127, 128

[56] References Cited

U.S. PATENT DOCUMENTS

| | | | |
|---|---|---|---|
| 4,618,529 | 10/1986 | Yamamura et al. | 428/224 |
| 4,624,812 | 11/1986 | Farrow et al. | 264/63 |
| 5,145,812 | 9/1992 | Arai et al. | 501/97 |
| 5,151,390 | 9/1992 | Aori et al. | 501/95 |
| 5,380,782 | 1/1995 | Bogan, Jr. | 524/404 |

*Primary Examiner*—Paul R. Michl
*Assistant Examiner*—Patrick Niland
*Attorney, Agent, or Firm*—Birch, Stewart, Kolasch & Birch, LLP

[57] ABSTRACT

A composition for manufacturing a fiber-reinforced molded ceramic body comprises a ceramic powder composed primarily of silicon nitride, inorganic fibers and a binder which are added to the ceramic powder. A fiber-reinforced molded ceramic body is manufactured by producing a slurry from such a composition, pouring the slurry into a mold to produce a fiber-reinforced molded ceramic body, and drying the fiber-reinforced molded ceramic body.

14 Claims, 2 Drawing Sheets

COMPOSITION FOR USE IN MANUFACTURING MOLDED CERAMIC BODY, METHOD OF MANUFACTURING MOLDED CERAMIC BODY FROM SUCH COMPOSITION, AND METHOD OF PRODUCING CERAMIC BODY

BACKGROUND OF THE INVENTION

1. Field of the Invention

The present invention relates to a composition for use in manufacturing a fiber-reinforced molded ceramic body, a method of manufacturing a fiber-reinforced molded ceramic body from such a composition, and a method of producing a ceramic body according to slip casting.

2. Description of the Related Art

One typical process of manufacturing molded ceramic bodies is known as a slip casting process. According to the slip casting process, a ceramic slurry or slip which comprises a suspension of ceramic power in water is poured into a mold made of a water-absorbing material such as plaster or the like, and the water of the slurry is absorbed into and passed through the mold, thereby forming a molded body (green body) of ceramic powder. The molded green body is then fired into a final sintered ceramic product. The slip casting process is generally suitable for manufacturing molded ceramic bodies of complex shapes.

In the production of a molded ceramic body according to the slip casting process, it has been the general practice to add, to the slip, an organic binder such as of carboxymethylcellulose, methylcellulose, polyvinyl alcohol, or the like for increasing the dry mechanical strength of the molded ceramic body. However, since the added organic binder increases the shrinkage ratio of the molded ceramic body, the molded ceramic body is liable to crack when removed from the plaster mold and dried. Another problem imposed by the use of an organic binder is that the process of producing a final ceramic component from the molded ceramic body is time-consuming because the molded ceramic body has to be degreased before being fired.

It has also been customary to add fibrous ceramic, rather than an organic binder, to a ceramic slip before it is poured into a mold. The addition of only one type of fibrous ceramic in a certain range is not effective because the molded ceramic body has a relatively low mechanical strength and a relatively high shrinkage ratio, making the molded ceramic body liable to crack when removed from the plaster mold and dried.

According to one specific slip casting process, a ceramic slurry or slip is prepared by adding water and a dispersant to a ceramic mixture of silicon nitride ($Si_3N_4$), yt-trium oxide ($Y_2O_3$), aluminum oxide ($Al_2O_3$), and spinel ($MgAl_2O_4$), and the prepared slip is poured into a porous mold made of plaster. The slip is then molded under a low pressure in the mold, thereby producing a preliminary molded body. The preliminary molded body is thereafter dried into a molded ceramic body. This slip casting process suffers problems when it is employed to produce a large molded ceramic body such as an axial turbine having a diameter of 100 mm or greater. Specifically, such a large molded ceramic body is highly likely to crack a few hours after being removed from the mold if a preliminary molded body therefor is naturally dried or dried in a standard drying mode in which it is maintained at a humidity ranging from 30 to 50% and a temperature of 180° C. for 15 hours in a constant-temperature, constant-humidity drier.

In order to prevent the molded ceramic body from cracking, it is necessary to dry the preliminary molded body in a high-humidity, constant-temperature drying mode immediately after it is removed from the mold. In the high-humidity, constant-temperature drying mode, the preliminary molded body is dried first at a temperature of 25° C. and a humidity of 90% in the constant-temperature, constant-humidity drier, with the humidity being subsequently gradually reduced over a long period of time. After the high-humidity, constant-temperature drying mode, it is then necessary to dry the preliminary molded body in the standard drying mode. Consequently, it is very time-consuming to dry the preliminary molded body into the ceramic body.

Japanese laid-open patent publication No. 4-144952 discloses a slip casting process of molding a ceramic body using a water-retaining additive which is composed of a polysaccharide produced by a microorganism. According to the disclosed process, a slurry or slip is prepared by adding water, a dispersant, and a polysaccharide to a ceramic powder composed of silicon nitride, yttrium oxide, and spinel, and poured into a plaster mold, thereby producing a preliminary molded body in the shape of a turbine rotor. The preliminary molded body is then dried with heat into a turbine rotor.

The above publication indicates that, since the polysaccharide is added to the ceramic powder, no density difference is caused between thin and thick portions of the turbine rotor, e.g., in a vane thereof, thus preventing the preliminary molded body from being deformed when dried with heat. The publication also reveals that a slurry is prepared by adding, as such a polysaccharide, β-1, 3-glucan (also known by its trivial name: curdian), represented by the chemical formula given below, in the range of from 0.3 to 5.0 parts by weight to 100 parts by weight of a ceramic powder composed of silicon nitride, yttrium oxide, and spinel.

(n = 400 ~ 500)

However, the slip casting process disclosed in the above publication is disadvantageous in that the preliminary molded body tends to crack when dried with heat. Depending on the composition of the ceramic powder, the polysaccharide added in the disclosed range is liable to make the slurry too viscous to allow the removal of bubbles produced during the preparation thereof and to be cast into the plaster mold.

SUMMARY OF THE INVENTION

It is therefore an object of the present invention to provide a composition for use in manufacturing a molded ceramic body, which has a high mechanical strength, a low shrinkage ratio, and good moldability.

Another object of the present invention is to provide a method of manufacturing a molded ceramic body from such a composition.

Still another object of the present invention is to provide an improved method of forming a ceramic body.

Yet still another object of the present invention is to provide an improved method of forming a ceramic body according to slip casting.

According to the present invention, there is provided a composition for in manufacturing a fiber-reinforced molded ceramic body, comprising a ceramic powder composed primarily of silicon nitride, inorganic fibers and a binder which are added to the ceramic powder.

The inorganic fibers may be made of aluminum oxide and/or silicon nitride.

The organic binder may comprise an emulsion of aqueous polyurethane.

According to the present invention, there is also provided a composition for in manufacturing a fiber-reinforced molded ceramic body, comprising a ceramic powder composed primarily of silicon nitride and at least two types of inorganic fibers of different materials which are added to the ceramic powder.

The two types of inorganic fibers may include fibers of aluminum oxide and fibers of silicon nitride.

According to the present invention, there is further provided a method of manufacturing a fiber-reinforced molded ceramic body, comprising the steps of producing a slurry from a composition described above, and pouring the slurry into a mold to produce a fiber-reinforced molded ceramic body.

According to the present invention, there is also provided a method of producing a ceramic body, comprising preparing a slurry by adding a water-retaining additive in the range of from 0.01 to 0.15 part by weight to water and 100 parts by weight of a ceramic powder, producing a preliminary molded body from the slurry according to slip casting, and drying the preliminary molded body with heat into a ceramic body.

The water-retaining additive may be composed of a polysaccharide produced by a microorganism. The polysaccharide may comprise β-1, 3-glucan.

The preliminary molded body has pores each having a diameter of at most 0.09 μm, and has a porosity of at most 45%.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

[1] Composition for use in manufacturing a molded ceramic body:

A composition for use in manufacturing a molded ceramic body according to the present invention comprises (a) a powder of silicon nitride, (b) a sintering additive (if required), (c) inorganic fibers, (d) a dispersant, (e) an organic binder (if required), and (f) water.

(a) Powder of silicon nitride:

In manufacturing ceramic products composed mainly of silicon nitride, a powder of silicon nitride of either the α-type or the β-type may be employed. The powder of silicon nitride may be manufactured by a process of directly nitriding silicon (Si), a process of reducing and nitriding silica, a process of thermally decomposing silicon diimide, a process of reacting $SiH_4+NH_3+N_2$ in a vapor phase, or the like. The powder of silicon nitride should have an average particle diameter in the range of from 0.01 to 3 μm, preferably in the range of from 0.1 to 1.3 μm.

(b) Sintering additive:

Since silicon nitride cannot easily be fired by itself, it is customary to add a sintering additive to silicon nitride before it is fired. According to the present invention, a sintering additive of aluminum oxide ($Al_2O_3$), yttrium oxide ($Y_2O_3$), ytterbium oxide ($Yb_2O_3$), hafnium oxide ($HfO_2$), aluminum nitride (A1N), magnesium oxide (MgO), or an element in the group IIIa of the periodic table, or a compound thereof is added to the powder of silicon nitride. The sintering additive is added as a powder having an average particle diameter in the range of from 0.1 to 8 μm, preferably in the range of from 0.3 to 5 μm.

The sintering additive is added in an amount depending on the type of the sintering additive used. If the total amount of the ceramic powder including the sintering additive and the inorganic fibers is 100% by weight, then the amount of the added sintering additive should preferably be in the range of from 0.5 to 15% by weight, more preferably in the range of from 1 to 5% by weight. If the amount of the added sintering additive were smaller than 0.5% by weight, then the sintered body produced by firing the molded ceramic body would not be dense enough, and if the amount of the added sintering additive exceeded 15% by weight, then the sintered body would have a desired mechanical strength at high temperatures.

(c) Inorganic fibers:

Fibers of aluminum oxide or silicon nitride should preferably be employed as the inorganic fibers. The inorganic fibers should preferably have an average diameter ranging from 1 to 20 μm and an average length ranging from 0.1 to 1 mm, and should more preferably have an average diameter ranging from 3 to 10 μm and an average length ranging from 0.3 to 0.6 mm. If the average diameter were less than 1 μm or the average length were less than 0.1 mm, then the molded ceramic body would not sufficiently be reinforced by the added inorganic fibers. If the average diameter were greater than 20 μm or the average length were greater than 1 mm, then the dispersibility of the added inorganic fibers would be low, the sintered body would be highly likely to be defective, and the sintering density thereof would be low.

If the total amount-of the ceramic powder including the sintering additive and the inorganic fibers is 100% by weight, then the amount of the added inorganic fibers should preferably be in the range of from 0.5 to 10% by weight, more preferably in the range of from 1 to 5% by weight. If the amount of the added inorganic fibers were smaller than 0.5% by weight, then the molded ceramic body would not sufficiently be reinforced by the added inorganic fibers. If the amount of the added inorganic fibers were greater than 10% by weight, then the dispersibility of the added inorganic fibers would be low, the sintered body would be highly likely to be defective, and the sintering density thereof would be low.

Inorganic fibers of different types, e.g., fibers of aluminum oxide and fibers silicon nitride, may be added. If a plurality of different types of inorganic fibers are to be added, each of the different types of inorganic fibers should be added preferably in an amount of at least 0.5% by weight and more preferably in an amount of at least 1% by weight while the total amount of the added inorganic fibers falls in the above range. If the amount of the added inorganic fibers of each type were less than 0.5% by weight, then the added inorganic fibers would not produce a desired effect, and a good mechanical strength, a good shrinkage ratio, and good moldability would not be achieved for the molded ceramic body.

(d) Dispersant:

To disperse the ceramic powder uniformly, a surface-active agent is added as a dispersant if required. If the total amount of the ceramic powder including the sintering additive and the inorganic fibers is 100 parts by weight, then the dispersant should be added preferably in an amount ranging from 0.3 to 1.5 part by weight and more preferably in an amount ranging from 0.8 to 1.2 part by weight. If the amount of the added dispersant were smaller than 0.3 part by weight, then the ceramic powder would be incompletely dispersed, and if the amount of the dispersant were greater than 1.5 part by weight, then the viscosity of the slurry would be too high.

(e) Organic binder:

The organic binder may be made of ethyl silicate, polyethylene glycol, polyvinyl alcohol (PVA), paraffin wax, polyurethane emulsion, or the like. Particularly preferable is an emulsion of aqueous polyurethane whose molecular weight ranges from 50 to 200 thousands and which has a hydrophilic group such as a carboxylic acid group (—COOH), a sulfonic acid group (—SO$_3$Na), or the like.

If the total amount of the ceramic powder including the sintering additive and the inorganic fibers is 100 parts by weight, then the organic binder should be added preferably in an amount ranging from 0.1 to 2 parts by weight (with respect to a resinous solid contained in the emulsion) and more preferably in an amount ranging from 0.8 to 1.2 part by weight. If the amount of the organic binder were smaller than 0.1 part by weight, then the green body, i.e., the molded ceramic body, would not have a sufficient mechanical strength. If the amount of the organic binder were in excess of 2 parts by weight, then the deposition rate and degreasability of the composition would be lowered, the green body would shrink to a large degree and stick to the mold when molded.

(f) Water:

If the total amount of the ceramic powder including the sintering additive and the inorganic fibers is 100 parts by weight, then the water should be added preferably in an amount ranging from 35 to 50 parts by weight and more preferably in an amount ranging from 40 to 43 parts by weight. If the amount of water were smaller than 35 parts by weight, then the slurry would not be flowable, and if the amount of water were larger than 50 parts by weight, then the viscosity of the obtained composition would be too low and it would be difficult to dry the molded ceramic body.

[2] Process of manufacturing a molded ceramic body from the composition:

The silicon nitride powder, the sintering additive, the inorganic fibers, the dispersant, and the organic binder are dispersed uniformly into an aqueous dispersing medium with a ball mill or the like, thus producing a slurry or slip.

The slurry thus produced is then cast into a mold which is made of a material capable of absorbing and permeating water, such as plaster. Since the dispersing medium is absorbed by and passes through the mold, the slurry is dehydrated, producing a shaped or molded green body.

Thereafter, the molded green body is removed from the mold and sufficiently dried. While the molded green body is being dried, it is prevented from being broken or cracked because it is well reinforced by the inorganic fibers or the organic binder uniformly dispersed therein.

In this manner, a molded ceramic body of silicon nitride in which inorganic fibers are uniformly dispersed is produced.

According to the above embodiment, since inorganic fibers or both inorganic fibers and an organic binder are contained in a molded ceramic body of ceramic powder which would otherwise be highly susceptible to breakage or cracking, the molded ceramic body has a high mechanical strength and a low shrinkage ratio, and is prevented from being easily broken or cracked.

The above embodiment of the present invention will be described in greater detail below with reference to Inventive and Comparative Examples. However, the present embodiment should not be interpreted as being limited to Inventive Examples given below.

INVENTIVE EXAMPLE 1

Assuming that the total amount of a ceramic powder including a sintering additive and inorganic fibers was 100 parts by weight, a ceramic powder composed of a powder of silicon nitride, a sintering additive, and fibers of aluminum oxide indicated in Table 1 below, 40 parts by weight of pure water, and a dispersant indicated in Table 1 were mixed together for 20 hours by a ball mill. Then, a binder indicated in Table 1 was added to the mixture, producing a slurry.

The produced slurry was cast into a plaster mold for molding a rotor for an axial turbine, thereby producing a crack-free molded body. The molded body was measured for moldability, a shrinkage ratio, and a mechanical strength. The measured results are shown in Table 2.

INVENTIVE EXAMPLE 2

Constituents indicated in Table 1, which differed from those of Inventive Example 1 in that a sintering additive of aluminum oxide was also added and inorganic fibers of silicon nitride were added, and 40 parts by weight of pure water were mixed into a slurry in the same manner as with Inventive Example 1. The slurry was then poured into a plaster mold, thereby producing a crack-free molded body in the same manner as with Inventive Example 1. The molded body was measured for moldability, a shrinkage ratio, and a mechanical strength. The measured results are shown in Table 2.

INVENTIVE EXAMPLE 3

Constituents indicated in Table 1, which differed from those of Inventive Example 1 in that inorganic fibers of silicon nitride were also added, and 40 parts by weight of pure water were mixed into a slurry in the same manner as with Inventive Example 1 with no binder added. The slurry was then poured into a plaster mold, thereby producing a crack-free molded body in the same manner as with Inventive Example 1. The molded body was measured for moldability, a shrinkage ratio, and a mechanical strength. The measured results are shown in Table 2.

INVENTIVE EXAMPLE 4

Constituents indicated in Table 1, which differed from those of Inventive Example 1 in that inorganic fibers of silicon nitride were also added, and 40 parts by weight of pure water were mixed into a slurry in the same manner as with Inventive Example 1. The slurry was then poured into a plaster mold, thereby producing a crack-free molded body in the same manner as with Inventive Example 1. The molded body was measured for moldability, a shrinkage ratio, and a mechanical strength. The measured results are shown in Table 2.

Comparative Example 1

A slurry was prepared from constituents indicated in Table 1, which differed from those of Inventive Example 1 in that inorganic fibers of different aluminum oxide were added, in the same manner as with Inventive Example 1 except that no organic binder was added. The slurry was then poured into a plaster mold, thereby producing a molded body in the same manner as with Inventive Example 1. The molded body had a low green strength and a high shrinkage ratio, and hence suffered occasional cracking. The molded body was measured for moldability, a shrinkage ratio, and a mechanical strength. The measured results are shown in Table 2.

Comparative Example 2

A slurry was prepared from constituents indicated in Table 1, which differed from those of Inventive Example 1 in that inorganic fibers of different aluminum oxide were added, in the same manner as with Inventive Example 1 except that no organic binder was added. The slurry was then poured into a plaster mold, thereby producing a molded body in the same manner as with Inventive Example 1. The molded body had a low green strength and a high shrinkage ratio, and hence suffered occasional cracking. The molded body was measured for moldability, a shrinkage ratio, and a mechanical strength. The measured results are shown in Table 2.

Comparative Example 3

A slurry was prepared from constituents indicated in Table 1 in the same manner as with Inventive Example 1 except that no organic binder was added. The slurry was then poured into a plaster mold, thereby producing a molded body in the same manner as with Inventive Example 1. The molded body had a low green strength and a high shrinkage ratio, and hence suffered occasional cracking. The molded body was measured for moldability, a shrinkage ratio, and a mechanical strength. The measured results are shown in Table 2.

Comparative Example 4

A slurry was prepared from constituents indicated in Table 1, which differed from those of Inventive Example 1 in that a sintering additive of aluminum oxide was also added and inorganic fibers of silicon nitride were added, in the same manner as with Inventive Example 1 except that no binder was added. The slurry was then poured into a plaster mold, thereby producing a molded body in the same manner as with Inventive Example 1. The molded body had a green strength and a shrinkage ratio which proved substantially satisfactory, but suffered occasional cracking or breakage. The molded body was measured for moldability, a shrinkage ratio, and a mechanical strength. The measured results are shown in Table 2.

Comparative Example 5

A slurry was prepared from constituents indicated in Table 1, which differed from those of Inventive Example 1 in that inorganic fibers of silicon nitride were added in a greater amount, in the same manner as with Inventive Example 1 except that no binder was added. The slurry was then poured into a plaster mold, thereby producing a molded body in the same manner as with Inventive Example 1. The molded body had a green strength and a shrinkage ratio which proved good, but a resulting sintered body suffered a low density. The molded body was measured for moldability, a shrinkage ratio, and a mechanical strength. The measured results are shown in Table 2.

Comparative Example 6

A slurry was prepared from constituents indicated in Table 1, which differed from those of Inventive Example 1 in that a sintering additive of aluminum oxide was also added and no inorganic fibers were added, in the same manner as with Inventive Example 1. The slurry was then poured into a plaster mold, thereby producing a molded body in the same manner as with Inventive Example 1. The molded body had a green strength which proved good, but had a high shrinkage ratio and hence suffered cracking. The molded body was measured for moldability, a shrinkage ratio, and a mechanical strength. The measured results are shown in Table 2.

Comparative Example 7

A slurry was prepared from constituents indicated in Table 1, which differed from those of Inventive Example 1 in that a sintering additive of aluminum oxide was also added and no inorganic fibers were added, in the same manner as with Inventive Example 1 except that a different organic binder was added. The slurry was then poured into a plaster mold, thereby producing a molded body in the same manner as with Inventive Example 1. The molded body had a green strength which proved good, but had a high shrinkage ratio and hence suffered cracking. The molded body was measured for moldability, a shrinkage ratio, and a mechanical strength. The measured results are shown in Table 2.

Comparative Example 8

A slurry was prepared from constituents indicated in Table 1, which differed from those of Inventive Example 1 in that a sintering additive of aluminum oxide was also added and no inorganic fibers were added, in the same manner as with Inventive Example 1 except that no organic binder was added. The slurry was then poured into a plaster mold, thereby producing a molded body in the same manner as with Inventive Example 1. The molded body had a green strength which proved good, but had a high shrinkage ratio and hence suffered cracking. The molded body was measured for mold-ability, a shrinkage ratio, and a mechanical strength. The measured results are shown in Table 2.

TABLE 1

| Examples | $Si_3N_4$[1] Amount pbw | Sintering additive Type | Amount pbw | Inorganic fibers Type | Amount pbw |
| --- | --- | --- | --- | --- | --- |
| In. Ex. 1 | 96 | Y[2] | 3 | Al-1[3] | 1 |
| In. Ex. 2 | 95 | Y[2] Al[5] | 3 1 | SiN[4] | 1 |
| In. Ex. 3 | 95 | Y[2] | 3 | Al-1[3] | 1 |

TABLE 1-continued

| | | | | | | |
|---|---|---|---|---|---|---|
| In. Ex. 4 | 95 | Y[(2)] | 3 | SiN[(4)] | 1 | |
| | | | | Al-1[(3)] | 1 | |
| Co. Ex. 1 | 96 | Y[(2)] | 3 | SiN[(4)] | 1 | |
| | | | | Al-2[(6)] | 1 | |

TABLE 1-continued

| Co. Ex. 2 | 96 | Y[(2)] | 3 | Al-3[(7)] | 1 |
| Co. Ex. 3 | 96 | Y[(2)] | 3 | Al-1[(3)] | 1 |
| Co. Ex. 4 | 95 | Y[(2)] | 3 | SiN[(4)] | 1 |
| | | Al[(5)] | 1 | | |
| Co. Ex. 5 | 95 | Y[(2)] | 3 | SiN[(4)] | 2 |
| Co. Ex. 6 | 96 | Y[(2)] | 3 | — | |
| | | Al[(5)] | 1 | | |
| Co. Ex. 7 | 96 | Y[(2)] | 3 | — | |
| | | Al[(5)] | 1 | | |
| Co. Ex. 8 | 96 | Y[(2)] | 3 | — | |
| | | Al[(5)] | 1 | | |

| | Dispersant | | Binder | |
|---|---|---|---|---|
| Examples | Type | Amount pbw | Type | Amount pbw |
| In. Ex. 1 | SNEX[(8)] | 1 | 700[(9)] | 1.0 |
| In. Ex. 2 | SNEX[(8)] | 1 | 700[(9)] | 1.0 |
| In. Ex. 3 | SNEX[(8)] | 1 | — | |
| In. Ex. 4 | SNEX[(8)] | 1 | 700[(9)] | 1.0 |
| Co. Ex. 1 | SNEX[(8)] | 1 | — | |
| Co. Ex. 2 | SNEX[(8)] | 1 | — | |
| Co. Ex. 3 | SNEX[(8)] | 1 | — | |
| Co. Ex. 4 | SNEX[(8)] | 1 | — | |
| Co. Ex. 5 | SNEX[(8)] | 1 | — | |
| Co. Ex. 6 | SNEX[(8)] | 1 | 700[(9)] | 1.0 |
| Co. Ex. 7 | SNEX[(8)] | 1 | WA311[(10)] | 1.0 |
| Co. Ex. 8 | SNEX[(8)] | 1 | — | |

[(1)]Powder of silicon nitride, average particle diameter: 0.4 μm, particle diameter range: 0.1–3 μm.
[(2)]Powder of yttrium oxide, average particle diameter: 5 μm, particle range: 1–8 μm.
[(3)]Fibers of aluminum oxide, "Saffil" manufactured by ICI, average diameter: 4 μm, average fiber length: 400 μm.
[(4)]Fibers of silicon nitride, "SNF" manufactured by Toa Nenryo Kogyo K.K., average diameter: 10 μm, average fiber length: 500 μm.
[(5)]Powder of aluminum oxide, average particle diameter: 0.6 μm, particle diameter range: 0.1–2 μm.
[(6)]Fibers of aluminum oxide, "MAFTEC" manufactured by Mitsubishi Chemical Industries, Ltd., average diameter: 4 μm, average fiber length: 200 μm.
[(7)]Fibers of aluminum oxide, "ALCEN" manufactured by Denki Kagaku Kogyo K.K., average diameter: 15 μm, average fiber length: 400 μm.
[(8)]"SNEX-7347C" manufactured by Sannopco Co., primarily composed of quaternary ammonium salt.
[(9)]Emulsion of aqueous polyurethane, "Superflex 700" manufactured by Daiichi Kogyo Seiyaku Co.
[(10)]Acrylic binder, "WA311" manufactured by Chukyo Yushi Co.

TABLE 2

| | Molded body | | | Sintered body | |
|---|---|---|---|---|---|
| Examples | Mechanical strength Mpa | Shrinkage ratio % | Moldability | Mechanical strength* Mpa | Density g/cm$^3$ |
| In. Ex. 1 | 3.4 | 0.69 | B | 620 | 3.21 |
| In. Ex. 2 | 2.8 | 0.68 | B | 608 | 3.21 |
| In. Ex. 3 | 3.2 | 0.65 | B | 583 | 3.21 |
| In. Ex. 4 | 4.1 | 0.5 | A | 590 | 3.21 |
| Co. Ex. 1 | 2.2 | 0.85 | C | 560 | 3.21 |
| Co. Ex. 2 | 2.5 | 0.8 | C | 483 | 3.13 |
| Co. Ex. 3 | 3.1 | 0.8 | C | 580 | 3.21 |
| Co. Ex. 4 | 3.2 | 0.8 | C | 597 | 3.21 |
| Co. Ex. 5 | 3.5 | 0.7 | C | 570 | 3.18 |
| Co. Ex. 6 | 4.2 | 0.9 | C | 603 | 3.21 |
| Co. Ex. 7 | 4.0 | 1.0 | D | 584 | 3.21 |
| Co. Ex. 8 | 2.2 | 1.1 | D | 632 | 3.21 |

*Measured according to a three-point bending test.
A: Very good
B: Good
C: The molded body became defective in a subsequent process.
D: Cracking was developed in the molded body.

As can be seen from Table 2 above, the molded bodies according to Inventive Examples 1, 2, and 4 where both the inorganic fibers and the organic binder were added, or the molded bodies according to Inventive Examples 3 and 4 where the different types of inorganic fibers were added have better moldability and higher better mechanical strength and shrinkage ratio, and were subjected to less cracking or breakage than the molded body according to Comparative Example 1 where neither the inorganic fibers nor the organic binder was added or the molded bodies according to Comparative Examples 2~8 where either the inorganic fibers or the organic binder was added. The molded body according to Inventive Example 4 where the different types of inorganic fibers and the organic binder were added had particular better moldability and particularly better mechanical strength and shrinkage ratio. A sintered body which is very dense and very strong can be produced from a molded body that is formed using a composition according to the present invention.

Since a molded ceramic body which has a high mechanical strength, a high shrinkage ratio, and good moldability can be produced according to the present invention, the present invention is suitable for manufacturing a molded ceramic body having a complex shape.

[3] Process of forming a molded ceramic body:

A process of forming a molded ceramic body according to another embodiment of the present invention will be described below.

According to the other embodiment of the present invention, a slurry is prepared by adding a water-retaining additive which is composed of a polysaccharide produced by a microorganism, in the range of from 0.01 to 0.15 part by weight to water and 100 parts by weight of a ceramic powder, and a preliminary molded body is produced from the slurry according to slip casting. Then, the preliminary molded body is dried with heat into a ceramic body.

If the amount of the added water-retaining additive were smaller than 0.01 part by weight with respect to 100 parts by weight the ceramic powder, then the evaporation of water from the preliminary molded body would not sufficiently be suppressed, allowing the preliminary molded body to be dried quickly, and hence the ceramic body would be cracked. If the amount of the added water-retaining additive were greater than 0.15 part by weight with respect to 100 parts by weight of the ceramic powder, then the viscosity of the slurry would be too high to remove bubbles from the slurry even with vacuum debubbling, and the slurry would not be molded according to slip casting.

The water-retaining additive may comprise a water-retaining additive of carboxylic acid, but should preferably be composed of a polysaccharide produced by a microorganism, particularly β-1, 3-glucan (known by its trivial name: curdlan), represented by the chemical formula given above, because the polysaccharide has an excellent ability to prevent water from being evaporated from the preliminary molded body.

The preliminary molded body has pores for the purpose of drying itself. The pores should preferably have a diameter of 0.09 μm or smaller, or the preliminary molded body should preferably have a porosity of 45% or less. However, the pore diameter and the porosity should not be nil. If the pore diameter were greater than 0.09 μm or the porosity were greater than 45%, then the slurry would be gelatinized and hence would lose flowability, and would not be molded into a preliminary molded body.

The addition of the water-retaining additive in the above range to the ceramic powder is effective to produce a slurry having properties suitable for slip casting. Since the preliminary molded body produced from the slurry contains the water-retaining additive in the above range, the preliminary molded body has a sufficient water-retaining capability at a room temperature ranging from 20° to 25° C. and a humidity ranging from 30 to 70% immediately after having been removed from the mold. When the preliminary molded body is heated, the added water-retaining additive is gelatinized. Inasmuch as the gelatinized water-retaining additive is effective to prevent the water from being evaporated from the preliminary molded body, the preliminary molded body is not dried too quickly when it is heated, and may be dried as if in the high-humidity, constant-temperature drying mode.

Consequently, after the preliminary molded body is produced, it is not required to be dried for a long period of time in the high-humidity, constant-temperature drying mode. Even when the preliminary molded body is heated to a temperature higher than the gelatinization temperature of the water-retaining additive, the preliminary molded body can be dried in a short period of time without cracking.

When the water-retaining additive comprises a polysaccharide produced by a microorganism, preferably curdlan represented by the chemical formula given above, it exhibits an excellent ability to prevent water from being evaporated from the preliminary molded body.

The preliminary molded body has pores. When the pores of the preliminary molded body have a diameter of 0.09 μm or smaller, or a porosity of 45% or less, the water-retaining additive exhibits a more excellent ability to prevent water from being evaporated from the preliminary molded body.

The above other embodiment of the present invention will be described in greater detail below with reference to Inventive and Comparative Examples. However, the above embodiment should not be interpreted as being limited to Inventive Examples given below.

INVENTIVE EXAMPLE 5

1260 g of water and 27 g of a dispersant (tradename: "SNEX-C7347" or "SNEX-7347" manufactured by San-nopco Co.) were added to 2895 g of $Si_3N_4$ (tradename: "SNE-10" manufactured by Ube Industries, Ltd.) having an average particle diameter ranging from 0.4 to 0.5 μm and a specific surface area ranging from 8 to 11 $m^2/g$ and 75 g of $Y_2O_3$ (manufactured by Japan Yttrium Co.) having an average particle diameter ranging from 0.4 to 0.5 μm, and they were ground into a uniform mixture for 40 hours. To the mixture were added 30 g of fibers of $Al_2O_3$ (tradename: "MAFTEC" manufactured by Mitsubishi Chemical Industries, Ltd. ) having a length ranging from 300 to 600 μm and a diameter of 10 μm or smaller and 0.3 g of curdlan (tradename: "BIOPOLY-P-3" manufactured by Takeda Chemical Industries, Ltd.) as a water-retaining additive. They were mixed into a slurry for three hours.

The slurry contained 0.01 part by weight of the water-retaining additive which was added to 100 parts by weight of the ceramic powder composed of 96.5 parts by weight of $Si_3N_4$, 2.5 parts by weight of $Y_2O_3$, and 1.0 part by weight of fibers of $Al_2O_3$.

Figure 1:
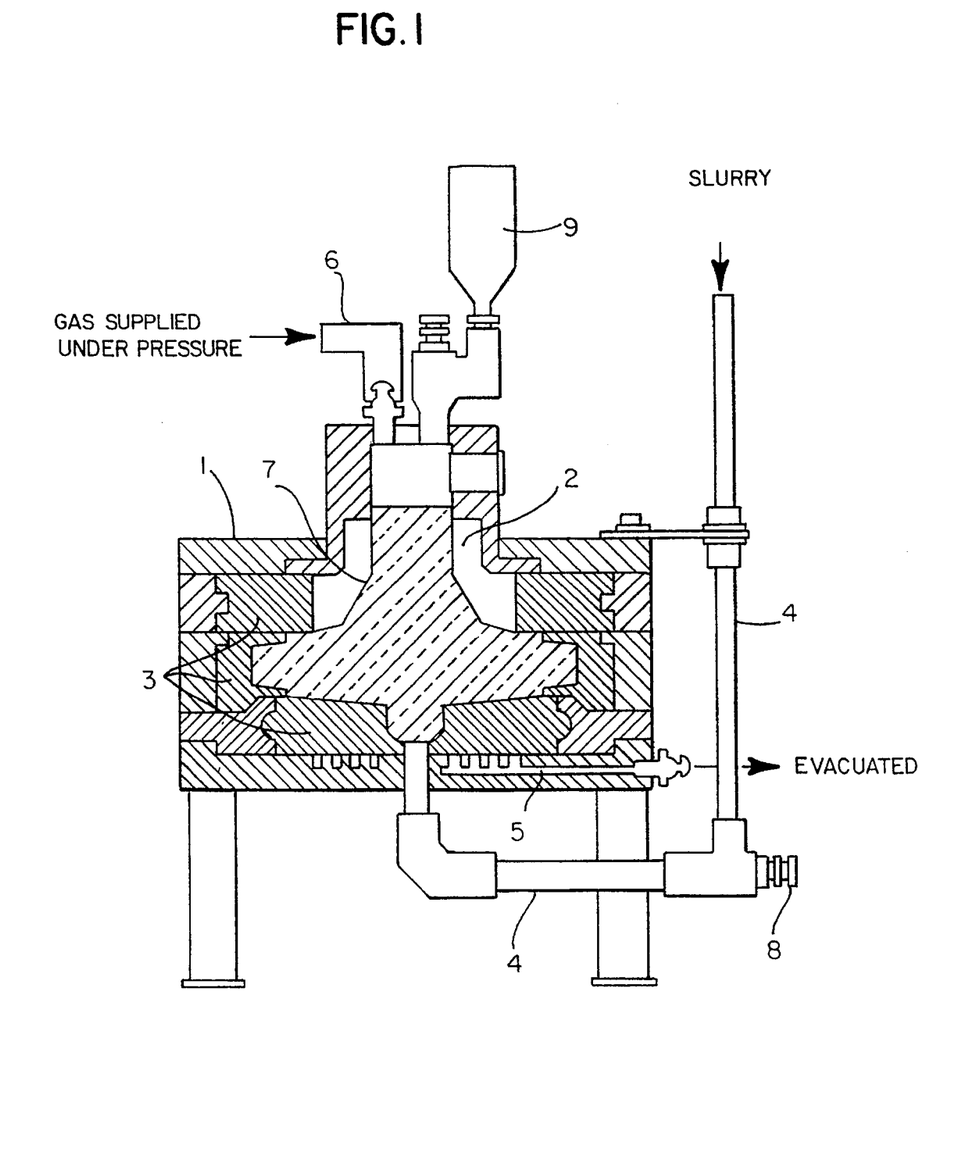
FIG. 1 is a cross-sectional view of a slip casting apparatus for carrying out a method of producing a ceramic body according to the present invention.

The slurry was placed in a sealed container and subjected to vacuum debubbling to remove bubbles produced during the preparation of the slurry while being stirred for 15 to 30 minutes. Thereafter, the slurry was molded into a preliminary molded body according to slip casting by a slip casting apparatus as shown in FIG. 1. The slip casting apparatus was designed to form a preliminary molded body which was to be fired into an axial turbine having a maximum diameter of 150 mm and a height of 110 mm. As shown in FIG. 1, the slip casting apparatus had a main body 1 with a cavity 2 defined therein and a plaster mold 3 disposed in the cavity 2. The slurry was introduced into the plaster mold 3 through a slurry supply pipe 4 connected to the bottom of the plaster mold 3. Thereafter, the plaster mold 3 was evacuated through an air discharge passage 5 connected to a vacuum pump (not shown) while at the same time a gas was introduced under pressure into the plaster mold 3 through a pressurization conduit 6 connected to an upper portion of the cavity 2, for thereby pressurizing and solidifying the slurry in the plaster mold 3 into a preliminary molded body 7.

When a predetermined amount of the slurry is introduced into the plaster mold 3 through the slurry supply pipe 4, a valve 8 connected to the slurry supply pipe 4 is closed to stop supplying the slurry. If, however, the plaster mold 3 is short of the slurry, it is supplemented with the slurry from a slurry supplementing unit 9.

The slurry was pressurized by the gas under a pressure of 4 $kg/cm^2$ for four hours, thereby forming the preliminary molded body 7. The preliminary molded body 7 thus formed had a pore diameter of 0.0690 μm, a porosity of 40.93%, and a bulk density of 2.0140 g/cc The pore diameter and the porosity were measured by a mercury pressure process, and the bulk density was measured from the weight and volume of the specimen according to a mercury pressure process.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

Three samples of the preliminary molded body 7 were produced. After being removed from the plaster mold 3, the samples of the preliminary molded body 7 were left to stand for two days. No cracking occurred in all the samples of the preliminary molded body 7.

INVENTIVE EXAMPLE 6

A slurry was prepared in the same manner as with Inventive Example 5 except that 1.5 g of curdlan was added.

The slurry contained 0.05 part by weight of the water-retaining additive which was added to 100 parts by weight of the ceramic powder composed of 96.5 parts by weight of $Si_3N_4$, 2.5 parts by weight of $Y_2O_3$, and 1.0 part by weight of fibers of $Al_2O_3$. The slurry had a pH 10.32 and a viscosity of 70 cps measured at 25.30° C. by an E-type viscometer, with an electromotive force of 197 mV.

When prepared, the slurry produced very few bubbles, which were easily removed by vacuum debubbling in the same manner as with Inventive Example 5. Then, the slurry was molded into a preliminary molded body 7 by the slip casting apparatus shown in FIG. 1. The preliminary molded body 7 had a pore diameter of 0.0710 μm, a porosity of 41.09%, and a bulk density of 2.0151 g/cc.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of crackling.

After three samples of the preliminary molded body 7 were removed from the plaster mold 3, they were left to stand for two days. No cracking occurred in any of the samples of the preliminary molded body 7.

INVENTIVE EXAMPLE 7

A slurry was prepared in the same manner as with Inventive Example 5 except that 3.0 g of curdlan was added. Therefore, the slurry contained 0.1 part by weight of the water-retaining additive which was added to 100 parts by weight of the ceramic powder composed of 96.5 parts by weight of $Si_3N_4$, 2.5 parts by weight of $Y_2O_3$, and 1.0 part by weight of fibers of $Al_2O_3$. The slurry had a pH 10.32 and a viscosity of 150 cps measured at 25.20° C. by a B-type viscometer, with an electromotive force of 197 mV.

When prepared, the slurry produced bubbles more or less, which were easily removed by vacuum debubbling in the same manner as with Inventive Example 5. Then, the slurry was molded into a preliminary molded body 7 by the slip casting apparatus shown in FIG. 1. The preliminary molded body 7 had a pore diameter of 0.0746 μm, a porosity of 42.71%, and a bulk density of 2.0151 g/cc.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

After three samples of the preliminary molded body 7 were removed from the plaster mold 3, they were left to stand for two days. Fine cracking occurred in one of the samples of the preliminary molded body 7, but no cracking was caused in the other two samples thereof.

INVENTIVE EXAMPLE 8

A preliminary molded body 7 was formed in the same manner as with Inventive Example 6 except that the slurry was pressurized first under a pressure of 2 kg/cm² for one hour, then under a pressure of 4 kg/cm² for two hours, and finally under a pressure of 2 kg/cm² for one hour by the slip casting apparatus.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

After three samples of the preliminary molded body 7 were removed from the plaster mold 3, they were left to stand for two days. No cracking occurred in all the samples of the preliminary molded body 7.

INVENTIVE EXAMPLE 9

A slurry was prepared in the same manner as with Inventive Examples 5~8 except that $Al_2O_3$ fibers manufactured by ICI (tradename: "Saffil") were used. Then, the slurry was molded into a preliminary molded body 7 by the slip casting apparatus shown in FIG. 1 in the same manner as with Inventive Examples 5~8.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

INVENTIVE EXAMPLE 10

A slurry was prepared in the same manner as with Inventive Examples 5~8 except that $Al_2O_3$ fibers manufactured by Denki Kagaku Kogyo K.K. (tradename: "ALCEN") were used. Then, the slurry was molded into a preliminary molded body 7 by the slip casting apparatus shown in FIG. 1 in the same manner as with Inventive Examples 5~8.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

INVENTIVE EXAMPLE 11

A slurry was prepared in the same manner as with Inventive Example 6 except that 30 g of a binder (tradename: "SF-410 manufactured by Daiichi Kogyo Seiyaku Co.) were added together with $Al_2O_3$ fibers and curdlan. Then, the slurry was molded into a preliminary molded body 7 by the slip casting apparatus shown in FIG. 1 in the same manner as with Inventive Example 6.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

INVENTIVE EXAMPLE 12

A preliminary molded body 7 was formed in the same manner as with Inventive Example 11 except that the slurry was pressurized first under a pressure of 2 kg/cm² for one hour, then under a pressure of 4 kg/cm² for two hours, and finally under a pressure of 2 kg/cm² for one hour by the slip casting apparatus.

Then, the preliminary molded body 7 was dried in the standard drying mode in which it was maintained at a humidity ranging from 30 to 50% and a temperature of 180° C. for 15 hours in a constant-temperature, constant-humidity drier. As a result, the preliminary molded body 7 was formed into a ceramic body in the shape of an axial turbine free of cracking.

Comparative Example 9:

A slurry was prepared in the same manner as with Inventive Example 5 except that no water-retaining additive was added. Then, the slurry was subjected to vacuum debubbling, and thereafter molded into a preliminary molded body 7 by the slip casting apparatus shown in FIG. 1 in the same manner as with Inventive Example 5.

Then, the preliminary molded body 7 was dried in the standard drying mode in which it was maintained at a humidity ranging from 30 to 50% and a temperature of 180° C. for 15 hours in a constant-temperature, constant-humidity drier. The preliminary molded body 7 was formed into a ceramic body in the shape of an axial turbine which suffered cracking.

Comparative Example 10

A slurry was prepared in the same manner as with Inventive Example 5 except that 15 g of curdlan were added. Thus, the slurry contained 0.5 part by weight of the water-retaining additive which was added to 100 parts by weight of the ceramic powder composed of 96.5 parts by weight of $Si_3N_4$, 2.5 parts by weight of $Y_2O_3$, and 1.0 part by weight of fibers of $Al_2O_3$.

The slurry had a high viscosity, and violently produced bubbles when prepared. The bubbles were not removed by vacuum debubbling effected for 15 to 30 minutes. It was not possible to supply the slurry into the plaster mold 3 through the slurry supply pipe 4 shown in FIG. 1.

Comparative Example 11

A slurry was prepared in the same manner as with Inventive Example 5 except that 30 g of curdlan were added. Thus, the slurry contained 1.0 part by weight of the water-retaining additive which was added to 100 parts by weight of the ceramic powder composed of 96.5 parts by weight of $Si_3N_4$, 2.5 parts by weight of $Y_2O_3$, and 1.0 part by weight of fibers of $Al_2O_3$.

The slurry had a higher viscosity than the slurry according to Comparative Example 10, and violently produced bubbles when prepared. The bubbles were not removed by vacuum debubbling effected for 15 to 30 minutes. It was not possible to supply the slurry into the plaster mold 3 through the slurry supply pipe 4 shown in FIG. 1.

INVENTIVE EXAMPLE 13

Preliminary molded bodies (test pieces) each having a diameter of 50 mm and a length of 75 mm were produced using the slurries according to Inventive Examples 6 and 7 by the slip casting apparatus shown in FIG. 1. Time-dependent changes in the weights of the test pieces were measured in a molding room at a room temperature of 21° C. and a humidity of 60% and reductions in the weights were regarded as amounts of evaporated water. The measured results are shown in FIG. 2.

In Inventive Example 7, the water-retaining additive of curdlan was replaced with water-retaining additives of carboxylic acid, and test pieces were produced using the slurries. Time-dependent changes in the weights of the test pieces were measured, and reductions in the weights were regarded as amounts of evaporated water. The water-retaining additives of carboxylic acid were three types manufactured by Sannopco Co. (tradenames: "MODICOL VD-S", "MODICOL IN-209", and "SN-thickener 920"). The measured results are shown in FIG. 2.

Figure 2:
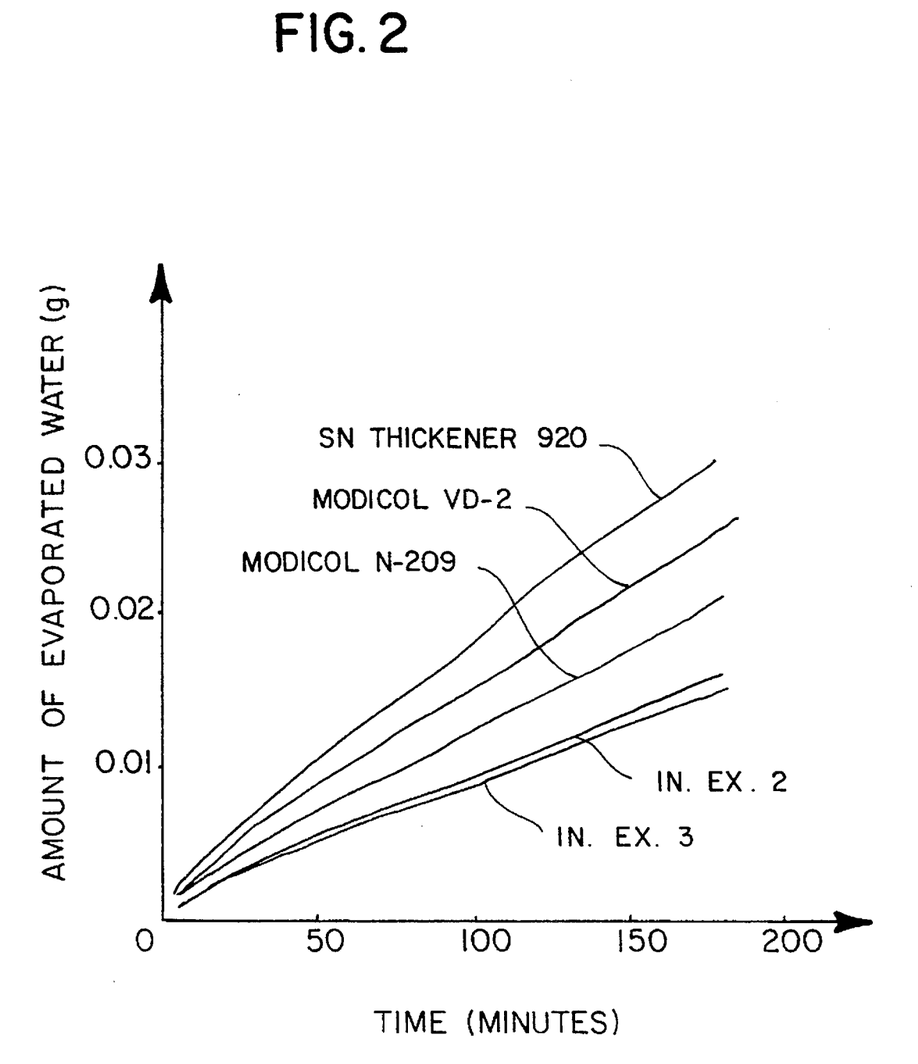
FIG. 2 is a graph showing amounts of water evaporated from preliminary molded bodies to which water-retaining additives are added.

It can be seen from FIG. 2 that the amounts of water evaporated from the test pieces were smaller with the water-retaining additive of curdlan than with the water-retaining additive of carboxylic acid, and hence the water-retaining additive of curdlan is more effective to suppress evaporation of water from the test pieces.

As described above, according to the above other embodiment of the present invention, a slurry having properties suitable for slip casting can be produced by adding a water-retaining additive in the above range to a ceramic powder. When a preliminary molded body produced from the slurry is heated, it can be dried in a short period of time without cracking while suppressing evaporation of water from the preliminary molded body.

When the water-retaining additive comprises a water-retaining additive of a polysaccharide produced by a microorganism, e.g., curdlan, it exhibits an excellent ability to prevent water from being evaporated from the preliminary molded body.

The preliminary molded body has pores. When the pores of the preliminary molded body have a diameter of 0.09 μm or smaller, or a porosity of 45% or less, the water-retaining additive exhibits a more excellent ability to prevent water from being evaporated from the preliminary molded body.

Although certain preferred embodiments of the present invention has been shown and described in detail, it should be understood that various changes and modifications may be made therein without departing from the scope of the appended claims.

What is claimed is:

1. A composition for manufacturing a fiber-reinforced molded ceramic body, comprising a ceramic powder composed primarily of silicon nitride, inorganic fibers and an organic binder, said binder comprising an emulsion of aqueous polyurethane, which are added to said ceramic powder.

2. A composition according to claim 1, wherein said inorganic fibers are made of aluminum oxide and/or silicon nitride.

3. A composition for manufacturing a fiber-reinforced molded ceramic body, comprising a ceramic powder composed primarily of silicon nitride and at least two types of inorganic fibers of different materials comprising fibers of aluminum oxide and fibers of silicon nitride, which are added to said ceramic powder.

4. A method for manufacturing a fiber-reinforced molded ceramic body, comprising the steps of:

producing a slurry from a composition according to claim 1; and pouring the slurry into a mold to produce a fiber-reinforced molded ceramic body.

5. A method of producing a ceramic body, comprising:

preparing a slurry by adding a water-retaining additive comprising a polyysaccharide produced by a microorganism which comprises β-1,3-glucan, in an amount in the range of from 0.01 to 0.15 part by weight to water and 100 parts by weight of a ceramic powder;

producing a preliminary molded body from said slurry by slip casting; and drying said preliminary molded body with heat to form a ceramic body.

6. A method according to claim 5, wherein said preliminary molded body has pores each having a diameter of at most 0.09 μm.

7. A method according to claim 5, wherein said preliminary molded body has pores, said preliminary molded body having a porosity of at most 45%.

8. A method of manufacturing a fiber-reinforced molded ceramic body, comprising the steps of:

producing a slurry from a composition according to claim 2; and pouring the slurry into a mold to produce a fiber-reinforced molded ceramic body.

9. A method of manufacturing a fiber-reinforced molded ceramic body, comprising the steps of:

producing a slurry from a composition according to claim 3; and pouring the slurry into a mold to produce a fiber-reinforced molded ceramic body.

10. A method of manufacturing a fiber-reinforced molded ceramic body, comprising the steps of:

producing a slurry from a composition according to claim 3; and pouring the slurry into a mold to produce a fiber-reinforced molded ceramic body.

11. A method of manufacturing a fiber-reinforced molded ceramic body, comprising the steps of:

producing a slurry from a composition according to claim 1; and pouring the slurry into a mold to produce a fiber-reinforced molded ceramic body.

12. A composition for manufacturing a fiber-reinforced molded ceramic body, comprising a ceramic powder composed primarily of silicon nitride and least two types of inorganic fibers of different materials having an average diameter ranging from 1 to 20 μm and an average length ranging from 0.1 to 1 mm, which are added to said ceramic powder.

13. The composition according to claim 12, wherein said inorganic fibers are present in a total amount of 0.5 to 10% by weight, based upon the total weight of ceramic powder.

14. The composition according to claim 13, wherein each of said types of inorganic fibers is present in an amount of at least 0.05% by weight, based upon the total weight of ceramic powder.

* * * * *